United States Patent

Wilkus et al.

[11] 3,855,241
[45] Dec. 17, 1974

[54] ARYL KETONE CONTAINING ORGANOSILICON MATERIALS

[75] Inventors: Edward V. Wilkus, Monroe, Conn.; Abe Berger, Schenectady, N.Y.

[73] Assignee: General Electric Company, Waterford, N.Y.

[22] Filed: Mar. 17, 1972

[21] Appl. No.: 235,811

Related U.S. Application Data

[62] Division of Ser. No. 56,632, July 20, 1970, Pat. No. 3,715,370, which is a division of Ser. No. 724,300, Feb. 2, 1968, Pat. No. 3,544,595.

[52] U.S. Cl. ...................... 260/329.3, 260/346.2 M
[51] Int. Cl. ............................................. C07d 63/24
[58] Field of Search ................. 260/329.3, 346.2 M

[56] References Cited
UNITED STATES PATENTS
3,715,370  2/1973  Wilkus et al. ...................... 260/335

*Primary Examiner*—John D. Randolph
*Assistant Examiner*—C. M. S. Jaisle
*Attorney, Agent, or Firm*—Donald J. Voss; E. Philip Koltos; Frank L. Neuhauser

[57] ABSTRACT

One class of organosilicon materials are provided having chemically combined

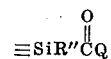

units, where R'' is a divalent hydrocarbon radical and Q is a radical selected from aryloxyaryl, arylthioaryl, arylsulfonylaryl, and certain heteroaromatic radicals. In addition, organosilicon polymers and copolymers are provided having chemically combined

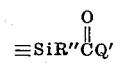

units, where Q' is a radical selected from Q radicals, monovalent aromatic hydrocarbon radicals and halogenated monovalent aromatic hydrocarbon radicals. The monomers and polymers can be employed as perfume oil bases, in cosmetics and as fluids in the manufacture of elastomers and resins.

3 Claims, No Drawings

ARYL KETONE CONTAINING ORGANOSILICON MATERIALS

This application is a division of parent application — Wilkus et al — ARYL KETONE CONTAINING ORGANOSILICON MATERIALS, Ser. No. 56,632, filed July 20, 1970, now issued into U.S. Pat. No. 3,715,370 which in turn is a divisional of parent case — Wilkus et al — ARYL KETONE CONTAINING ORGANOPOLYSILOXANE MATERIALS, Ser. No. 724,300, filed Feb. 2, 1968, which has now issued into U.S. Pat. No. 3,544,595.

The present invention relates to organosilicon materials having at least one aroylorgano radical attached to silicon by carbon-silicon linkages.

The organosilicon materials of the present invention comprise

A. monomers of the formula, (1) 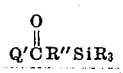

and

B. disiloxanes of the formula, (2) 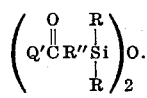

Additional organosilicon materials of the present invention, or "aryl ketone-containing organosilicon materials" are selected from C. silylorganoaryl ketones of the formula, (3) 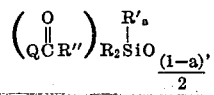

D. polymers consisting essentially of chemically combined units of the formula, (4) 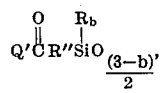

E. copolymers composed of 0.01 to 99.99 mole percent of organosiloxy units of the formula, (5) 

chemically combined with 99.99 mole percent to 0.01 mole percent of units of (D), and F. curable compositions comprising (a) a curing agent and (b) a silanol chain-stopped polymer selected from
   i. homopolymers consisting essentially of chemically combined units of the formula, (6) 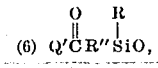

and
   ii. copolymers of from 5 to 95 mole percent of (i) units chemically combined with from 95 mole percent to 5 mole percent of $R_2SiO$ units, where R is a member selected from monovalent hydrocarbon radicals, halogenated monovalent hydrocarbon radicals, cyanoalkyl radicals, halogen radicals, alkoxy, R' is selected from R radicals and hydroxyl radicals, R" is a divalent hydrocarbon radical selected from arylene radicals and alkylene radicals, Q is a monovalent aromatic radical selected from aryloxyaryl radicals, arylthioaryl radicals, arylsulfonylaryl radicals, and heteroaromatic radicals having as the hetero atom a member selected from oxygen, sulfur, phosphorous and nitrogen, said heteroaromatic radicals being selected from five-membered heterocyclic radicals and heterocyclic radicals which are part of a fused ring structure, Q' includes all of the aforementioned Q radicals, aromatic hydrocarbon radicals and halogenated aromatic hydrocarbon radicals, $a$ and $b$ are whole numbers equal to 0 or 1, $c$ is a whole number equal to 0 to 3, inclusive, and the sum of $b$ and $c$ is the copolymers of (E) can have a value between 1 to 2.01, inclusive.

Radicals included by R and R' of the above formulae are, for example, aryl radicals and halogenated aryl radicals such as phenyl, chlorophenyl, xylyl, tolyl, etc.; aralkyl radicals such as phenylethyl, benzyl, etc.; aliphatic radicals, haloaliphatic radicals and cycloaliphatic radicals such as methyl, ethyl, propyl, butyl, vinyl and allyl, cyclohexyl, trifluoropropyl, trifluorobutyl, cyanoalkyl radicals such as cyanoethyl, cyanopropyl, cyanobutyl, etc.; halogen radicals such as chloro, bromo, etc., alkoxy radicals such as methoxy, ethoxy, propoxy, butoxy, t-butoxy, etc. Radicals included by R" of the above formulae are arylene radicals, halogenated arylene radicals, alkylene radicals and halogenated alkylene radicals such as phenylene, tolylene, methylene, ethylene, trimethylene, tetramethylene, pentamethylene, decamethylene, chlorophenylene, etc. Radicals included by Q of the above formulae are for example, phenoxyphenyl, furyl, thienyl, xanthenyl, anthryl, xylylsulfonylxylyl, benzofuranyl, carbazolyl, dibenzothienyl, etc. Radicals included by Q' are all of the aforementioned Q radicals, as well as monovalent aromatic hydrocarbons and halogenated monovalent hydrocarbons such as phenyl, chlorophenyl, naphthyl, biphenylyl, etc. In the above formulae, where R, R', Q and Q' respectively can represent more than one radical, all of these radicals can be the same or a mixture of any two or more of these radicals.

Some of the aryl ketone containing organosilicon materials of the present invention can be made directly by acylating an aryl nucleus, which hereinafter will signify at least one member of a class of aryl nuclei which can include hydrocarbons as well as heterocyclics, with a silyl acid halide of the formula, (7) 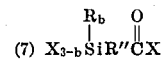

where R, R' and c are as defined above, and X is a halogen radical, such as chloro.

Aryl nuclei which can be employed to provide for the aryl ketone containing organosilicon materials of the present invention are for example, benzene, naphthalene, anthracene, diphenylether, furan, thiophene, dixylylsulfone, dibenzofuran, carbazole, dibenzothiophene, etc. Unlike the method shown in our copending application, U.S. Pat. No. 3,410,822 filed concurrently herewith and assigned to the same assignee as the present invention, which can provide for the production of dicarbonyl containing organosilicon materials by deacylating various aryl nuclei, the method of the present invention provides for production of aryl ketone containing organosilicon materials by the monoacylation of the aforementioned aryl nuclei.

Carboxylic acid halides of formula (7), and methods for making them, are shown by Somer et al, J.A.C.S 73, 5130, (1951). Included by the carboxylic acid halide of formula (7) are beta-trichlorosilylpropionyl chloride, gamma-methyldichlorosilylbutyryl chloride, gamma-phenylmethylchlorosilylbutyryl chloride, trimethylsilylpropionyl chloride, etc.

Acylation catalysts that can be utilized to effect reaction between the silyl acid halide of formula (7), with the aryl nucleus in accordance with the practice of the invention, include for example, aluminum chloride, boron trichloride, zinc chloride, stannic chloride, polyphosphoric acid, boron trifluoride, etc.

Organosilicon polymers of the present invention having chemically combined siloxy units with aroylorgano radicals attached to silicon, as shown by formula (4), can be made by either hydrolyzing halosilylorganoaryl ketones of the formula,

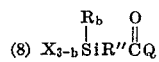

(8) $X_{3-b}SiR''CQ$ produced by acylating various aryl nuclei with certain of the silyl acid halides of formula (7), or by cohydrolizing such halosilylorganoaryl ketones with organohalosilanes of the formula, (9) $(R)_c SiX_{(4-c)}$ where R, X, b and c are as defined above.

Included by organohalosilanes of formula (9) are for example, methyltrichlorosilane, silicon tetrachloride, methylphenyldibromosilane, dimethyldichlorosilane, trimethylchlorosilane, methylvinyldichlorosilane, methylcyanoethyldichlorosilane, etc.

Some of the silylorganoaryl ketones of formula (3) are, for example, trimethylsilylbutyrylthiophene, 1,3-bis-(4-phenoxybenzoylpropyl)tetramethyldisiloxane, 1,3-bis-(furoylpropyl)tetramethyldisiloxane, 2-trimethylsilylpropionylxanthene, furoylpropyldimethylsilanol, p-phenoxybenzoylpropylmethyldimethylsilane, thenoylbutyldimethylchlorosilane, 3-diethoxymethylsilylbutyrylcarbazole. These materials can be used as perfumes, oil bases in cosmetics, etc.

The aryl ketone containing organosilicon polymers of the present invention can be fluids, viscous gums, or resinous solids depending upon the functionality of the respective chemically combined units. The polymers can be composed of from 2,000 to 3,000 chemically combined units, while preferably they are composed of from 5 to 500 chemically combined units. Among the aryl ketone containing organosilicon polymers, there are preferred polymers consisting essentially of chemically combined units of formula (6), and copolymers consisting essentially of units of formula (6) and $R_2SiO$ units. As indicated previously, the aforementioned polymers and copolymers can be silanol chain-stopped, or if desired, chain-stopped with $R_3SiO_{0.5}$ units.

The aryl ketone containing organosilicon polymers of the present invention can be compounded with conventional organopolysiloxane elastomer materials such as silica fillers, for example, fumed silica, etc., heat-age additives, plasticizers, pigments, etc. A proportion of from about 5 to 300 parts of filler which can include reinforcing as well as non-reinforcing fillers, such as zinc oxide, diatomaceous earth, can be employed. Cure of the aryl ketone containing organosilicon polymers can be effected with conventional room temperature vulcanizing curing agents, such as methyltriacetoxysilane, or curing agents such as organosilicates, in combination with a metal soap such as dibutyltindilaurate, zinc octoate, etc., as taught by Berridge U.S. Pat. No. 2,845,541, assigned to the same assignee as the present invention. A peroxide curing catalyst also can be employed such as benzoyl peroxide, dicumyl peroxide, etc., in instances where a heat-cure is desired, such as where the aforementioned polymers are terminated with $R_3SiO_{0.5}$ units and contain chemically combined $(C_2H_3)CH_3SiO$ units. In addition, cure can be effected with the employment of a platinum catalyst as taught for example by Ashby U.S. Pat. No. 3,159,601, Lamoreaux U.S. Pat. No. 3,220,972, both assigned to the same assignee as the present invention, in combination with chemically combined siloxy units having hydrogen attached to silicon and siloxy units having alkenyl radicals attached to silicon which can be chemically combined with units of formula (4).

Some of the aryl ketone containing organosilicon materials of the present invention can be further shown by the formula,

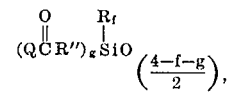

where R, R'' and Q are as defined above, $f$ has a value of from 0 to 2.5, inclusive, $g$ has a value of from 0.001 to 1, inclusive, and the sum of $f$ and $g$ has a value equal to 1 to 3, inclusive.

In the practice of the invention, the aryl nucleus is acylated with a silyl acid halide as shown in formula (7) and the resulting silylorganoaryl ketone is recovered. In instances where there are hydrolyzable radicals attached to silicon, the resulting silylorganoaryl ketone can be hydrolyzed or cohydrolyzed with halosilanes, as shown by formula (9), to produce a variety of organopolysiloxane polymers and copolymers.

In most instances the acylation of the aryl nucleus can be accomplished by standard Friedel-Crafts methods. Experience has shown, however, that a modified Friedel-Crafts procedure is preferably employed when utilizing a silyl acid halide having no more than two carbon atoms between the silicon atoms and the carbonyl group. It has been found that such silyl acid halides, for example, a silyl propionyl halide often decomposes when mixed directly with a Friedel-Crafts catalyst such as an aluminum halide in the absence of the aryl nucleus. Instead of forming a stable complex with the aluminum halide, silyl acid halides having more than two carbon atoms between the silicon atom and the carbonyl group can partially decompose to carbon monoxide and the corresponding halosilanes and olefin, if the complex is formed in the absence of the aryl nucleus previously described. Generally, any standard Friedel-Crafts acylation procedure can be utilized for acylating the aryl nucleus. In instances where a silyl acid halide such as propionyl halide is used, however, it is preferred to add the Friedel-Crafts catalyst in small increments to a mixture of the aryl nucleus and the silyl acid halide.

If desired, a suitable organic solvent can be utilized during the acylation of the aryl nucleus to facilitate the acylation reaction. Suitable organic solvents are any organic solvents that are substantially inert to the reactants or to the conditions of the reaction and which facilitate the acylation of the aryl nucleus. Suitable organic solvents include for example, methylene chloride, nitrobenzene, carbon disulfide, etc. Temperatures at which the acylation of the aryl nucleus can be effected can vary widely. For example, a range of from −50° to 100° C has been found operable, while a range of between 0° to 50° C is preferred. Any standard Friedel-Crafts catalyst can be utilized to effect the acylation of the aryl nucleus with the silyl acid halide. A preferred Friedel-Crafts catalyst is aluminum chloride. Other Friedel-Crafts catalysts that can be employed however, are, for example, $BF_3$, $ZnCl_2$, $H_3PO_4$, $SnCl_4$, etc.

The acylation of the aryl nucleus will be completed when no further hydrogen halide, produced during the acylation reaction, is evolved. The acylated aryl nucleus then can be hydrolyzed by standard procedures. An acidified mixture of water and ice can be employed, for example. The crude product can be extracted by use of a suitable organic solvent, and then purified in accordance with standard procedures such as chromatography, distillation, etc.

Further reaction of the acylated aryl nucleus also can be achieved such as alkylarion, sulfonation, and other standard reactions analogous to chemical reactions common to organic aromatic chemistry. In addition, the monovalent functional groups on the silicon atom of the silylorgano radical can also be replaced with other monovalent radicals to provide for additional chemical reactions with the acylated aryl nucleus. For example, a silicon-carbon cleavage reaction can be utilized to form silanol radicals. Silicon halogen bonds can be alkoxylated to form alkoxysilanes, etc.

In order that those skilled in the art will be better able to practice the invention, the following examples are given by way of illustration and not be way of limitation. All parts are by weight.

EXAMPLE 1

There was added 130 parts of anhydrous stannic chloride to a mixture of 90 parts of trimethylsilylbutyryl chloride, 100 parts methylene chloride, and 84 parts of thiophene under a nitrogen atmosphere. Hydrogen chloride was continually evolved as the mixture was stirred resulting in the production of a deep colored complex. The mixture was allowed to warm to room temperature and stirred for an additional 3 hours. It was then heated to reflux for 3 more hours. The mixture was then stirred with a mixture of crushed ice and dilute hydrochloric acid. After the reaction product had been completely hydrolyzed, the organic layer was separated, dried and fractionated. There was obtained 70 parts of a product boiling at 134° – 137° C at 1.5 mm. Based on method of preparation and its infrared spectrum, the product was trimethylsilylbutyryl-2-thiophene having the formula,

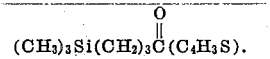

EXAMPLE 2

There was added 130 parts of anhydrous stannic chloride to a mixture of 100 parts of chlorodimethylsilylbutyryl chloride, 100 parts methylene chloride, and 84 parts of thiophene under an inert nitrogen atmosphere. During the reaction the mixture was cooled externally with an ice bath. A red complex formed and hydrogen chloride was continuously evolved. The mixture was allowed to warm to room temperature, stirred for an additional 3 hours, and then refluxed for 3 more hours. The mixture was poured into a mixture of crushed ice and dilute hydrochloric acid, as described above. The organic layer was dried and fractionated. A 73 percent yield of produce was obtained which distilled at 228° C at 1 mm. Based on its method of preparation and its infrared spectrum, the product was 1,3-bis(gamma-thenoylpropyl)tetramethyldisiloxane having the formula,

EXAMPLE 3

The procedure of Example 2 was repeated, except that prior to the hydrolysis of the acylated thiophene, there was added to the mixture 645 parts of dimethyldichlorosilane. After thoroughly stirring the resulting mixture, it was poured into a mixture of 500 parts of ice and 5 percent solution of hydrochloric acid. The organic layer was separated, and washed repeatedly with aqueous sodium bicarbonate solution until neutral to litmus; it was dried with anhydrous magnesium sulfate. Based on its method of preparation and its infrared spectrum, the product was a polydimethylsiloxane having terminal γ-thenoylpropyldimethylsilyl linkages of the average formula,

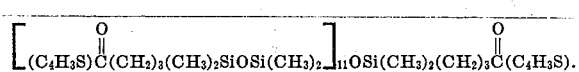

EXAMPLE 4

There was added uniformly over a 30 minute period, 4.2 parts of anhydrous aluminum chloride to a mixture of 15 parts of diphenylether, 5 parts of beta-trimethylsilyl propionyl chloride, and 50 parts of methylene chloride while the mixture was stirred. During the addition, hydrogen chloride was continuously evolved. The mixture was then stirred for an additional hour and then refluxed for two more hours. The mixture was then hydrolyzed in accordance with the procedure described in Example 1, and the crude oily product was purified by chromatography on a column packed with Alcoa F-20 alumina in hexane. Elution with hexane removed the excess diphenyl ether; elution with ether gave 7 parts of a colorless oil whose infrared spectrum showed absorption for alkylaryl ketone at 6.0 microns, for methyl-to-silicon at 8.0 microns, and for the trimethylsilyl grouping at 11.6 microns. In addition, absorption characterizing diphenyl ether was found at 6.3 microns, 6.8 microns, 8.3 microns, 7.5 microns, 13.3 microns and 14.4 microns. Based on its method of preparation and its infrared spectrum, the product was (beta-trimethylsilylpropionyl)-diphenylether having the formula,

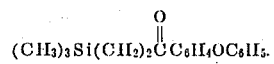

$(CH_3)_3Si(CH_2)_2\overset{O}{\overset{\|}{C}}C_6H_4OC_6H_5.$

EXAMPLE 5

There was added 3.8 parts of anhydrous aluminum chloride over a period of 30 minutes to a stirred mixture of 5.4 parts of beta-dimethylchlorosilylpropionyl chloride, 15 parts of diphenylether, and 40 parts of methylene chloride. The mixture was stirred several additional hours during which time HCl was continuously evolved. The mixture was then hydrolyzed and the organic product was recovered as previously described. A crude oil was obtained which was purified by chromatography on a column packed with Alcoa F-20 alumina in hexane. Elution with hexane removed excess diphenylether; elution with diethylether gave 4 parts of a colorless oil. Based on its method of preparation and its infrared spectrum which showed absorption for alkylaryl ketone at 6.0 microns, methyl-to-silicon at 8.0 microns, in addition to linear disiloxane linkages at 9.5 microns, and typical absorption for diphenylether at 6.35 and 6.8, etc., the product was 1,3-bis[beta(phenoxybenzoyl)ethyl]-tetramethyldisiloxane having the formula, $O[Si(CH_3)_2(CH_2)_2CC_6H_4OC_6H_5]_2.$ The above procedure was repeated except that in place of beta-dimethylchlorosilylpropionyl chloride there was employed gamma-dimethylchlorosilylbutyryl chloride. There was obtained a colorless oil which was 1,3-bis[gamma-(phenoxybenzoyl)propyl]tetramethyldisiloxane having the formula, $O[Si(CH_3)_2(CH_2)_3CC_6H_4OC_6H_5]_2.$

EXAMPLE 6

There was added 3.5 parts of anhydrous aluminum chloride to a stirred mixture of 4 parts of xanthene and 4.1 parts of beta-trimethylsilylpropionyl chloride in 50 parts of methylene chloride. During and after the addition was completed, HCl was continuously evolved. The mixture was stirred for an additional 8 hours. It was then hydrolyzed and the crude product was recrystallized from a hexene-toluene mixture. A white crystalline solid having a melting point of 94° – 94.5° C was obtained. Based on its method of preparation and its infrared spectrum showing absorption at 6.0 microns and carbonyl-to-aryl linkages as well as absorption for the presence of trimethylsilyl at 11.5 to 12 microns, plus absorption characteristics of mono-substituted xanthene, the product was beta-trimethylsilylpropionylxanthene having the formula,

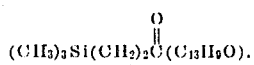

EXAMPLE 7

The procedure of Example 6 was repeated, except that in place of 4.1 parts of beta-trimethylsilylpropionyl chloride there was utilized 4.5 parts of gamma-trimethylsilylbutyryl chloride. A crude product was obtained which was recrystallized from a hexene-toluene mixture. There was obtained 1.4 parts of a white crystalline solid having a melting point of 97° – 98° C. Based on its method of preparation and its infrared spectrum the product was gamma-trimethylsilylbutyrylxanthene having the formula,

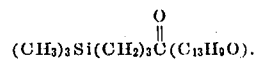

EXAMPLE 8

There was added over a 30 minute period, 3.9 parts of anhydrous aluminum chloride to a stirred mixture of 15 parts of dibenzothiophene and 5 parts of gamma-trimethylsilylbutyryl chloride in methylene chloride. Hydrogen chloride was continuously evolved during the addition. The mixture was stirred for an additional 8 hours, after which it was refluxed for 1 hour. The mixture was then hydrolyzed and the crude product was purified by chromatography on a column packed with Alcoa F-20 alumina in hexane in accordance with the procedure described above. Hexane elution removed the excess dibenzothiophene; ether gave a 61 percent yield of yellow solid. Based on its method of preparation and its infrared spectrum, the product was gamma-trimethylsilylbutyryldibenzothiophene having the formula,

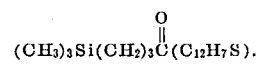

EXAMPLE 9

There was added 4.2 parts of anhydrous aluminum chloride to a stirred mixture of 15 parts of dibenzofuran and 5 parts of beta-trimethylsilylpropionyl chloride in 50 parts methylene chloride. After the addition, the mixture was stirred continuously for several hours to effect the separation of hydrogen chloride. A crude product was obtained in accordance with the previously described procedure by hydrolysis and recovery techniques. It was recrystallized from hexane. A 51 percent yield of solid was obtained; the solid had a melting point of 65° to 67° C. Based on its method of preparation and its infrared spectrum, the solid was beta-trimethylsilylpropionyldibenzofuran having the formula,

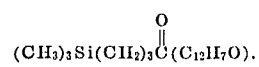

EXAMPLE 10

There was added 9 parts of anhydrous aluminum chloride to a mixture consisting of 100 parts anhydrous benzene and 14 parts of dichloromethylsilylpropionyl chloride under a nitrogen atmosphere. The addition was performed over a period of 2 hours at ambient temperatures. As the reaction proceeded, a deep red complex developed and copious amounts of HCl gas were evolved. After the addition, the reaction mixture was refluxed for 6 hours. A deep red color solution was obtained. The solution was divided equally into two portions. Fraction 1 was poured onto 100 parts ice and heated on a steam bath to effect hydrolysis. Two layers developed. The organic layer was separated, washed to neutrality, dried and solvent stripped. A viscous oil remained behind having a pleasant odor. An infrared scan showed carbonyl absorption at 5.95, some silanol absorption at 2.95 and a broad siloxane absorption at 9.1 – 10.4 microns. Based on method of preparation, the product was a mixture of linear and cyclic material composed of chemically combined

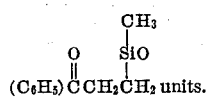

units.

There was added 65 parts of dimethylchlorosilane to the second portion and the above procedure was repeated. A viscous liquid was obtained having an infrared scan similar to the above product having carbonyl and phenyl absorption of diminished intensity. Based on method of preparation, the product was a silanol-terminated copolymer composed of chemically combined

units and

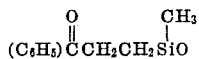

units.

A mixture of the above copolymer, tetraethyl silicate and stannous octoate is made in accordance with the teaching of Berridge U.S. Pat. No. 2,845,541. There is obtained a tack-free elastomer after 8 hours.

EXAMPLE 11

There was added 29 parts of a boron trifluorideethyl ether complex to a mixture of 68 parts furan and 40 parts chlorodimethylsilylbutyryl chloride, cooled on an ice bath and maintained under an inert atmosphere. A mild exothermic reaction occurred. The reaction mixture darkened as it proceeded to a deep reddish brown color. After the addition, the mixture was poured into crushed ice. There was added 100 parts of chloroform to effect separation. The organic phase was recovered and washed to neutrality with sodium bicarbonate solution, dried and stripped. There was obtained 15 parts of a liquid product having a pleasant odor. Infrared showed carbonyl absorption at 5.89 microns, absorption at 3.10 – 3.30 microns showed silanol. It had a b.p. of 85° – 87° C at 1 mm. Based on method of preparation and its infrared absorption, the product was

EXAMPLE 12

There was added 13.3 parts of aluminum chloride to a mixture of 22.6 parts trichlorosilylpropionyl chloride and 150 parts benzene maintained under a nitrogen atmosphere. The addition was performed at room temperature over a 3 hour period. A red colored complex formed which gradually darkened, and evolution of hydrogen chloride was observed. After the addition, the reaction was brought to reflux and held there for 5 hours. The above mixture is divided into two portions. There is added to one portion of the mixture, 15 parts of phosphorous oxychloride. The mixture is stirred and a precipitate of an aluminum chloride-phosphorous oxychloride complex results. The mixture is filtered and the organic layer stripped. There is obtained a crude liquid product. Its infrared spectrum is consistent with the formula,

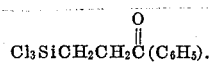

Hydrolysis of the other portion of the mixture was effected by pouring it onto 30 parts ice; it was then heated on a steam bath. A crude product was recovered with chloroform which was added to the mixture; the organic layer was separated, washed to neutrality, dried and stripped. A 45 percent yield of resin was obtained which could be drawn into filaments. An infrared scan of the material showed carbonyl absorption at 5.98 microns, a very broad siloxane absorption from 8.5 to 10 microns and silanol absorption. Based on its method of preparation and infrared spectra the product was a polymer which consisted essentially of chemically combined

units.

The mixture of the above polymer and 10 percent by weight of the polymer of methyltriacetoxysilane is allowed to cure under atmospheric conditions. A tack-free elastomer is obtained after 10 hours.

Although the foregoing examples have been limited to only a few of the very many variables within the scope of the present invention, it should be understood that the present invention is directed to a method involving the acylation of a much broader class of aryl nuclei with silyl acid halide of formula (7) in the presence of a Friedel-Crafts catalyst.

What we claim is:

1. An aryl ketone containing organosilicon compound selected from the class consisting of (A) monomers of the formula,

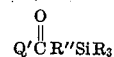

and (B) disiloxanes of the formula,

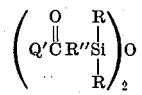

where R is a member selected from the class consisting of aryl of up to eight carbon atoms, haloaryl of up to eight carbon atoms, aralkyl of up to eight carbon atoms, alkyl of up to four carbon atoms, alkenyl of up to three carbon atoms, cycloalkyl of up to six carbon atoms, haloalkyl of up to four carbon atoms, cyanoalkyl of up to four carbon atoms, halo and alkoxy of up to four carbon atoms; R'' is a member selected from the class consisting of alkylene of up to 10 carbon atoms, haloalkylene of up to 10 carbon atoms, arylene of up to seven carbon atoms and haloarylene of up to seven carbon atoms; and Q' is a member selected from the class consisting of dibenzothiophene and dibenzofuran.

2. An aryl ketone of claim 1 having the structure,

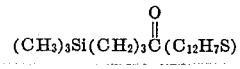

3. An aryl ketone of claim 1 having the structure,

* * * * *